United States Patent
Chen et al.

(10) Patent No.: US 7,930,275 B2
(45) Date of Patent: Apr. 19, 2011

(54) SYSTEM AND METHOD FOR RESTORING AND RECONCILING A SINGLE FILE FROM AN ACTIVE FILE SYSTEM AND A SNAPSHOT

(75) Inventors: Raymond C. Chen, Campbell, CA (US); Kayuri Patel, Cupertino, CA (US); Andy C. Kahn, San Francisco, CA (US); John K. Edwards, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 373 days.

(21) Appl. No.: 11/290,217

(22) Filed: Nov. 29, 2005

(65) Prior Publication Data

US 2006/0089953 A1 Apr. 27, 2006

Related U.S. Application Data

(63) Continuation of application No. 10/100,948, filed on Mar. 19, 2002, now Pat. No. 7,051,050.

(51) Int. Cl.
*G06F 17/30* (2006.01)
*G06F 12/00* (2006.01)

(52) U.S. Cl. ........................ 707/674; 711/202; 711/161

(58) Field of Classification Search .................. 711/202, 711/162
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 6,065,037 A | 5/2000 | Hitz et al. | |
| 6,173,293 B1* | 1/2001 | Thekkath et al. | 707/201 |
| 6,237,001 B1* | 5/2001 | Bamford et al. | 707/100 |
| 6,282,570 B1* | 8/2001 | Leung et al. | 709/224 |

(Continued)

OTHER PUBLICATIONS

US 5,741,972, 08/1999, Hoese et al. (withdrawn).

(Continued)

*Primary Examiner* — Etienne P LeRoux
*Assistant Examiner* — Mohammad N Rahman
(74) *Attorney, Agent, or Firm* — Cesari and McKenna, LLP

(57) ABSTRACT

The present invention relates to a system for restoring a file from a snapshot, where a version of the file exists in both an active file system and the snapshot. A twin inode is created in the active file system and comparisons are made between block pointers of the twin inode and the snapshot. If there is a match, the block pointer of the twin inode is moved to the active file system. If there is not a match, a determination is made whether the snapshot block pointer exists in the active file system. If the snapshot block pointer does not exist in the active file system, it is copied to the active file system. If it does exist, then the actual data block pointed to by the snapshot block pointer is copied to the active file system. In this way, a file may be restored without the need to always copy every individual data block or inode from the snapshot.

15 Claims, 13 Drawing Sheets

U.S. PATENT DOCUMENTS

| | | | |
|---|---|---|---|
| 6,289,356 B1 * | 9/2001 | Hitz et al. | 707/201 |
| 6,425,035 B2 | 7/2002 | Hoese et al. | |
| 6,748,504 B2 * | 6/2004 | Sawdon et al. | 711/162 |
| 6,751,635 B1 | 6/2004 | Chen et al. | |
| 6,868,414 B2 * | 3/2005 | Khanna et al. | 707/3 |
| 7,051,050 B2 | 5/2006 | Chen et al. | |
| 7,293,097 B2 * | 11/2007 | Borr | 709/229 |
| 2003/0126247 A1 | 7/2003 | Strasser et al. | |
| 2003/0182301 A1 | 9/2003 | Patterson et al. | |
| 2005/0033757 A1 | 2/2005 | Greenblatt et al. | |
| 2006/0218210 A1 * | 9/2006 | Sarma et al. | 707/204 |

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, CMU-ITC-87-068, Aug. 1987.

Howard, John H., An Overview of the Andrew File System, Carnegie Mellon University, CMU-ITC-88-062 1988.

Howard, John, H. et al., Scale and Performance in a Distributed File Sytem, ACM Trans. Computer System, 6(1), Feb. 1988 pp. 51-81.

Kazar, Michael Leon, Synchronization and Caching Issues in the Andrew File System, Carnegie Mellon University, CMU-ITC-88-063, 1988.

Kazar, Michael L., et al., DEcorum File System Architectural Overview, USENIX Summer Conference, Anaheim, California, 1990.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14( 2): 155-168 , Feb. 1988.

Kistler, et al., Disconnected Operation in the Coda File System, ACM Transactions on Computer Systems, vol. 10, No. 1, Feb. 1992, pp. 3-25.

Lorie, Raymond, A. Physical Integrity in a Large Segmented Database, ACM Trans. Database Syst., vol. 2, Mar. 1977, pp. 91-104.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley 1987.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.

Peterson, Zachary Nathaniel Joseph, Data Placement for Copy-on-Write Using Virtual Contiguity, University of CA, Santa Cruz, Master's Thesis for the Department of Science in Computer Science; Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering And Computer Sciences, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Hitz et al., "File System Design for an NFS File Server Appliance" TR 3002, Jul. 2001, 1-10.

* cited by examiner

SYSTEM AND METHOD FOR RESTORING AND RECONCILING A SINGLE FILE FROM AN ACTIVE FILE SYSTEM AND A SNAPSHOT

RELATED APPLICATIONS

This Application for United States Patent is a continuation of U.S. patent application Ser. No. 10/100,948 filed on Mar. 19, 2002 entitled System and Method for Restoring a Single File from a Snapshot, now issued as U.S. Pat. No. 7,051,050.

FIELD OF THE INVENTION

The present invention relates to data backup and restoral and, more particularly restoring a single file from a backup.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system manages data access and may, in case of a filer, implement file system semantics, such as the Data ONTAP™ storage operating system, implemented as a microkernel, and available from Network Appliance, Inc., of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

Some known file systems contain the capability to generate a snapshot of the file system. In the example of a WAFL based file system, snapshots are described in *TR3002 File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

A snapshot is a restorable version of a file system created at a predetermined point in time. Snapshots are generally created on some regular schedule. The snapshot is stored on-disk along with the active file system, and is called into the buffer cache of the filer memory as requested by the storage operating system. An exemplary file system inode structure 100 is shown in FIG. 1. The inode for an inode file 105 contains information describing the inode file associated with a given file system. In this exemplary file system inode structure the inode for the inode file 105 contains a pointer to an inode file indirect block 110. The inode file indirect block 110 contains a set of pointers to inodes 117, which in turn contain pointers to indirect blocks 119. The indirect blocks 119 include pointers to file data blocks 120A, 120B and 120C. Each of the file data blocks 120(A-C) is capable of storing, in the illustrative embodiment, 4 kilobytes (KB) of data.

When the file system generates a snapshot of a given file system, a snapshot inode is generated as shown in FIG. 2. The snapshot inode 205 is, in essence, a duplicate copy of the inode for the inode file 105 of the file system 100. Thus, the exemplary file system structure 200 includes the inode file indirect blocks 110, inodes 117, indirect blocks 119 and file data blocks 120A-C as in FIG. 1. When a user modifies a file data block, the file system layer writes the new data block to disk and changes the active file system to point to the newly created block.

FIG. 3 shows an exemplary inode file system structure 300 after a file data block has been modified. In this illustrative example, file data block 120C was modified to file data block 120C'. When file data block 120C is modified to file data block 120C', the contents of the modified file data block are written to a new location on disk as a function of the exemplary WAFL file system. Because of this new location, the indirect block 319 must be rewritten. Due to this changed indirect block 319, the inode 317 must be rewritten. Similarly, the inode file indirect block 310 and the inode for the inode file 305 must be rewritten. Thus, after a file data block has been modified the snapshot inode 205 contains a point to the original inode file indirect block 110 which in turn contains pointers through the inode 117 and an indirect block 119 to the original file data blocks 120A, 120B and 120C. However, the newly written indirect block 319 includes pointers to unmodified file data blocks 120A and 120B. The indirect block 319 also contains a pointer to the modified file data block 120C' representing the new arrangement of the active file system. A new inode for the inode file 305 is established representing the new structure 300. Note that metadata (not shown) stored in any snapshotted blocks (e.g., 205, 110, and 120C) protects these blocks from being recycled or overwritten until they are released from all snapshots. Thus, while the active file system inode for the inode file 305 points to new blocks 310, 317, 319, 120A, 120B and 120C', the old blocks 205, 110 and 120C are retained until the snapshot is fully released.

After a snapshot has been created and file data blocks modified, the file system layer can reconstruct or "restore" the file system inode structure as it existed at the time of the snapshot by accessing the snapshot inode. By following the pointers contained in the snapshot inode 205 through the inode file indirect block 110 and indirect block 119 to the unmodified file data blocks 120A-C, the file system layer can reconstruct the file system as it existed at the time of creation of the snapshot.

In known restoration techniques from snapshots, the snapshotted files are copied from the snapshot to the active file system. Such copies are generated by duplicating inodes and data blocks stored in the snapshot and writing these duplicated blocks and inodes to the active file system. Thus, the snapshot is effectively duplicated into the active file system. A noted disadvantage of such a restore technique is that each inode or data block of the snapshot needs to be copied. Such copying, in the case of a large file or file system, can require a substantial amount of time and processing power. Similarly, using known file restore techniques from a snapshot, the volume containing the snapshotted file must be large enough to accommodate two full copies of the file, namely, the snapshot and the file in the active file system. In the example of the large database file, a volume may not be of sufficient size to accommodate two full copies of the database file.

One technique to avoid resource-consuming duplication of the entire file system is to use the file system's capabilities to restore on demand. Restore on demand techniques are described generally in U.S. patent application Ser. No. 10/101,901 entitled SYSTEM AND METHOD FOR MANAGING A PLURALITY OF SNAPSHOTS by Hugo Patterson et al., now issued as U.S. Pat. No. 7,475,098 on Jan. 6, 2009. However, such restore on demand techniques typically utilize the snapshot copying methodology, described above, to restore a particular file. Thus, the noted disadvantages of the snapshot duplication method, e.g. processing overhead and use of file system space are inherent in these restore on demand techniques.

However, there are instances when the restoration of only a single file from a snapshot is desired. For example, the file system may not suffer an error condition, but a single file may become corrupted. Additionally, a user may have modified a file but later desires to restore the file to a previous state. In these instances, the restoration of the entire file system is clearly an inefficient approach.

SUMMARY OF THE INVENTION

The disadvantages of the prior art are overcome by providing a system and method for quickly restoring a file from a snapshot. If the file to be restored has been deleted from the active file system, then an inode is created and its associated buffer tree is generated which points to the data blocks of the file to be restored. This newly created inode and associated buffer tree is then written to the active file system, thereby restoring the file. By avoiding duplication of the data blocks, substantial storage space, processing overhead and time is saved. If the file exists in the active file system, then the system and method duplicates the file's inode into a twin inode, and moves the buffer tree of the file to the twin inode. A new inode for the restored file is generated. A reconciliation process then compares block pointers from the duplicated twin inode and the snaphot inodes. If the block pointers match, the block pointer is moved from the twin inode into the inode of the restored file in the active file system. If the block pointers and the block is not allowed in the active file system differ, then the block pointer from the snapshot is copied to the active file system. Otherwise, the actual data block is copied from the snapshot to the active file system. At the end of the reconciliation process, the twin inode will only contain block pointers to blocks that have changed with respect to the snapshot. After completion of the reconciliation process, the file will have been restored to the active file system.

By not duplicating the numerous data blocks stored in the snapshot, substantial processing time/overhead and storage space is saved. In an alternate embodiment, a determination can be made of the size in the file to be restored. If the file is of a certain size or smaller, the restore system and method utilizes the conventional snapshot duplication technique.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 4:
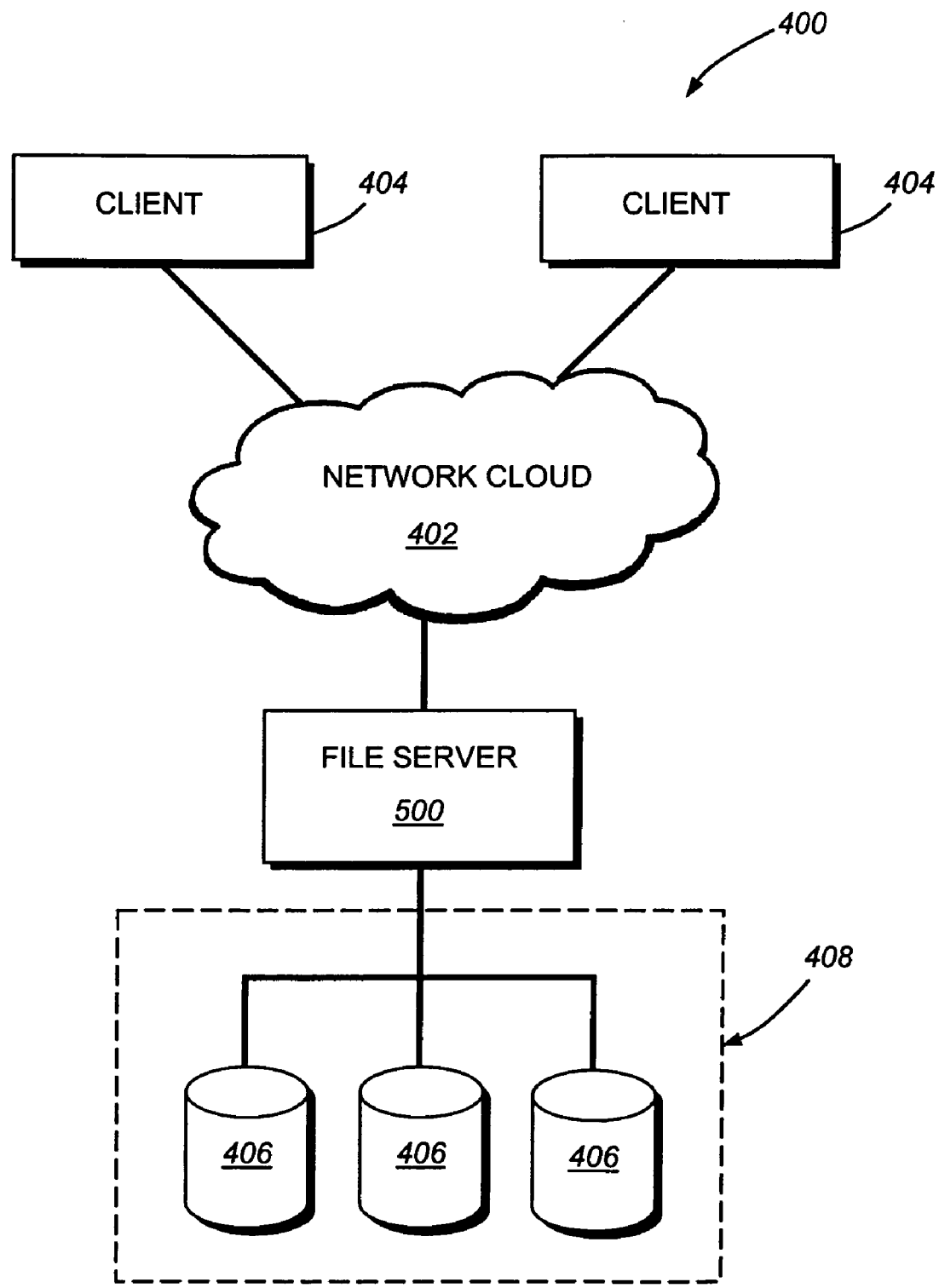
FIG. 4 is a schematic block diagram of an exemplary network environment having a file server and network-connected clients.

FIG. 4 is a schematic block diagram of an exemplary network environment 400 in which the principles of the present invention are implemented. The environment 400 is based around a network cloud 402. This network cloud can be a local or network (LAN), a wide area network (WAN), virtual private network (VPN) utilizing communication links over the internet, for example, or a combination of LAN, WAN and VPN implementations can be established. For the purposes of this description, the term network cloud should taken broadly to include any acceptable network architecture. The network cloud 402 interconnects various clients 404. Also attached to the network cloud is a file server 500. This file server, described further below, is configured to control storage of, and access to, data and a set 408 of interconnected storage volumes 406. Each of the devices attached to the network cloud include an appropriate conventional network interface arrangement (not shown) for communicating over the network cloud using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

B. File Servers

Figure 5:
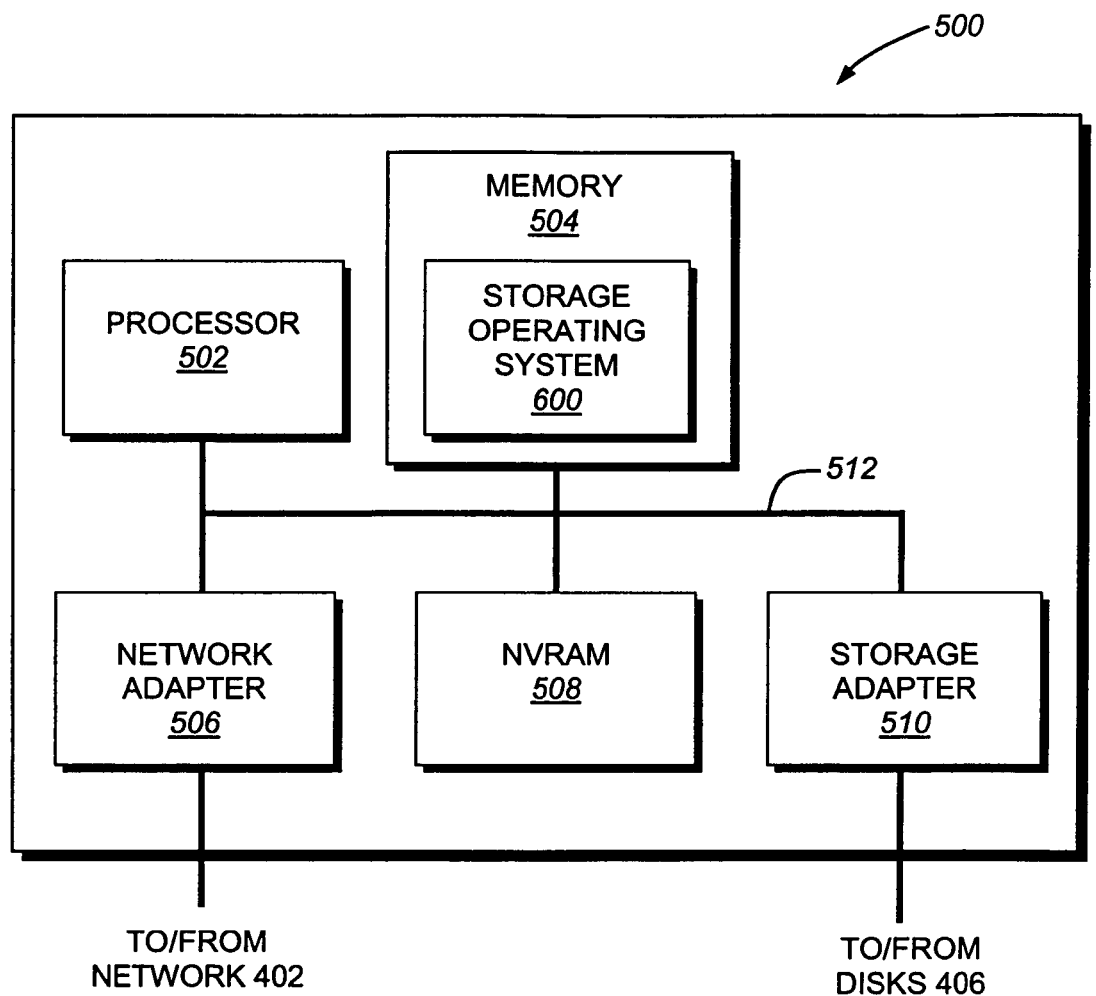
FIG. 5 is a schematic block diagram of an exemplary file server in accordance with an embodiment of this invention.
Figure 6:
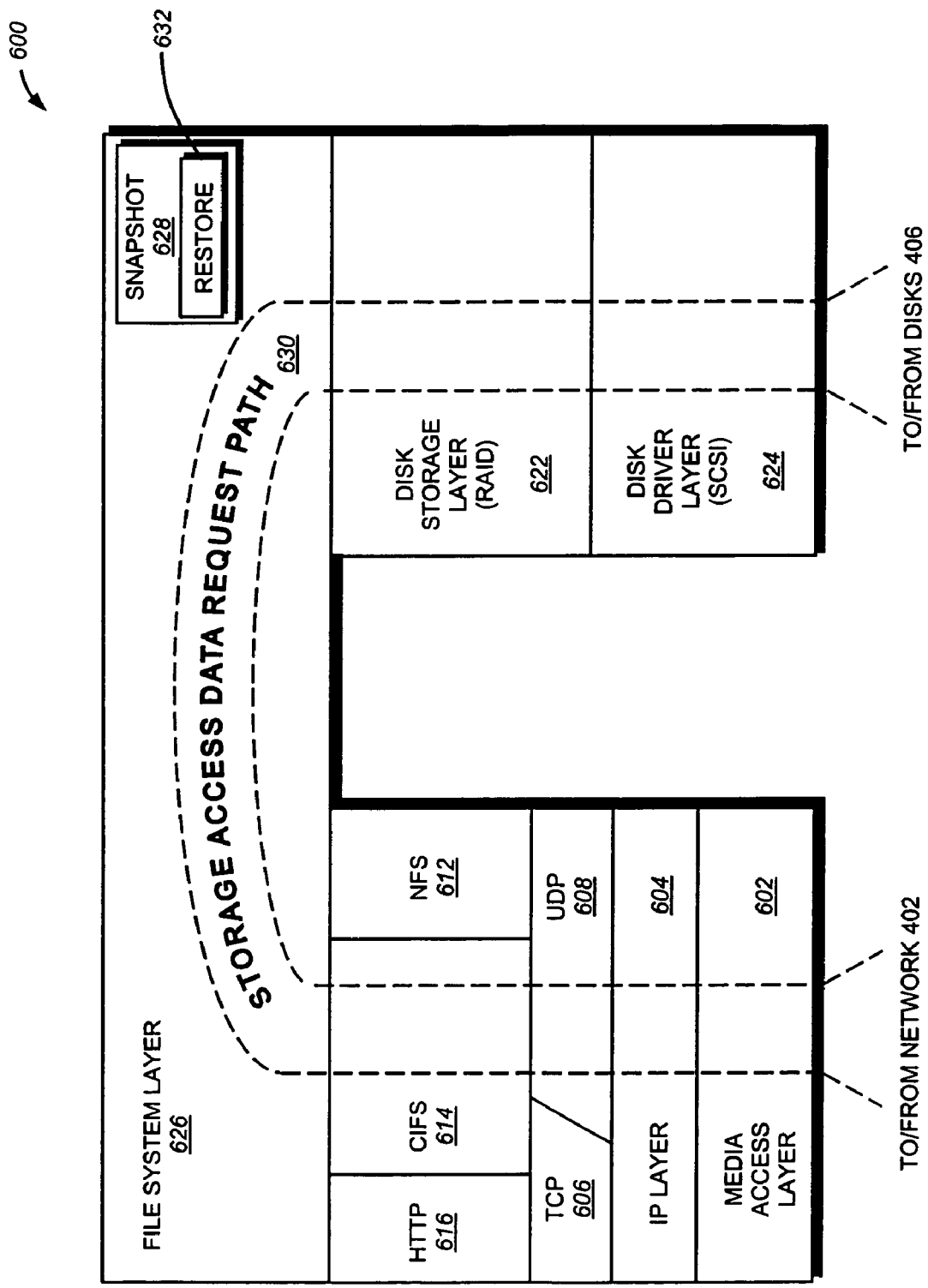
FIG. 6 is a schematic block diagram of an exemplary storage operating system for use in accordance with an embodiment of this invention.

FIG. 5 is a more-detailed schematic block diagram of an exemplary file server 500. By way of background, a file server or filer, is a computer that provides file service relating to the organization of information on storage devices, such as disks. However, it will be understood by those skilled in the art that the inventive concepts described here any may apply to any type of file server, wherever implemented as a special-purpose or general-purpose computer, including a standalone computer.

The file server 500 comprises a processor 502, a memory 504, a network adapter 506, a nonvolatile random access memory (NVRAM) 508 and a the storage adapter 510 interconnected by system bus 512. Contained within the memory 504 is a storage operating system 600 that implements a file system to logically organize the information as a hierarchical structure of directories and files on the disks. In the illustrative embodiment, the memory 504 comprises storage locations that are addressable by the processor and adapters for storing software program code. The operating system 600, portions of which are typically resident in memory and executed by the processing elements, functionally organizes the filer by inter alia, invoking storage operations in support of a file service implemented by the file server.

The network adapter 506 comprises a mechanical, electrical and signaling circuitry needed to connect the file server 400 to client 404 over network cloud 402. The client 404 maybe a general-purpose computer configured to execute applications, such as data base applications. Moreover, the client 404 may interact with the filer server 500 in accordance with the client/server model of information delivery. That is, the client may request the services of the file server, and the file server may return the results of the services requested by the client, by exchanging packets defined by an appropriate networking protocol.

Figure 1:
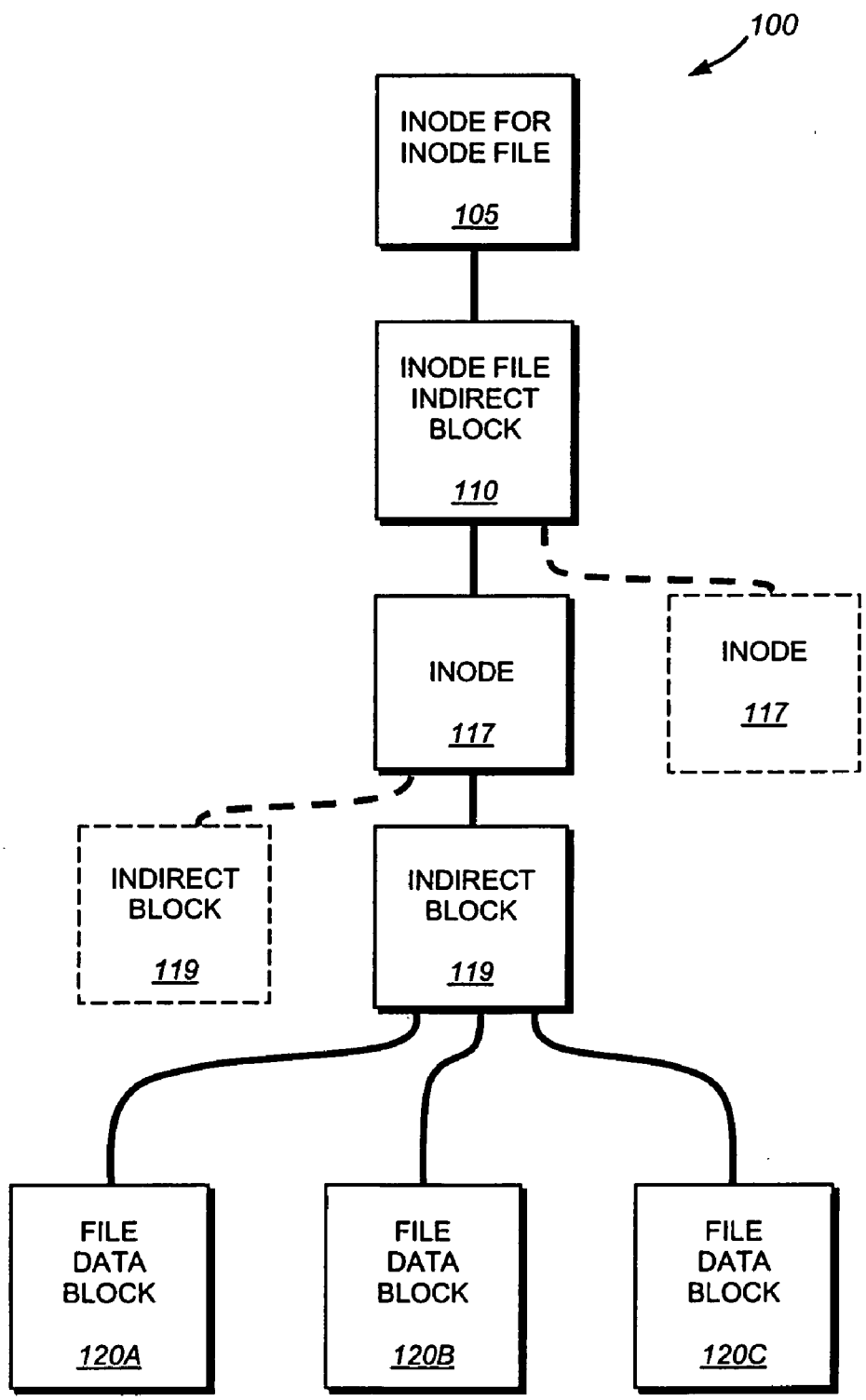
FIG. 1, already described, is a schematic block diagram of an exemplary file system inode structure.
Figure 2:
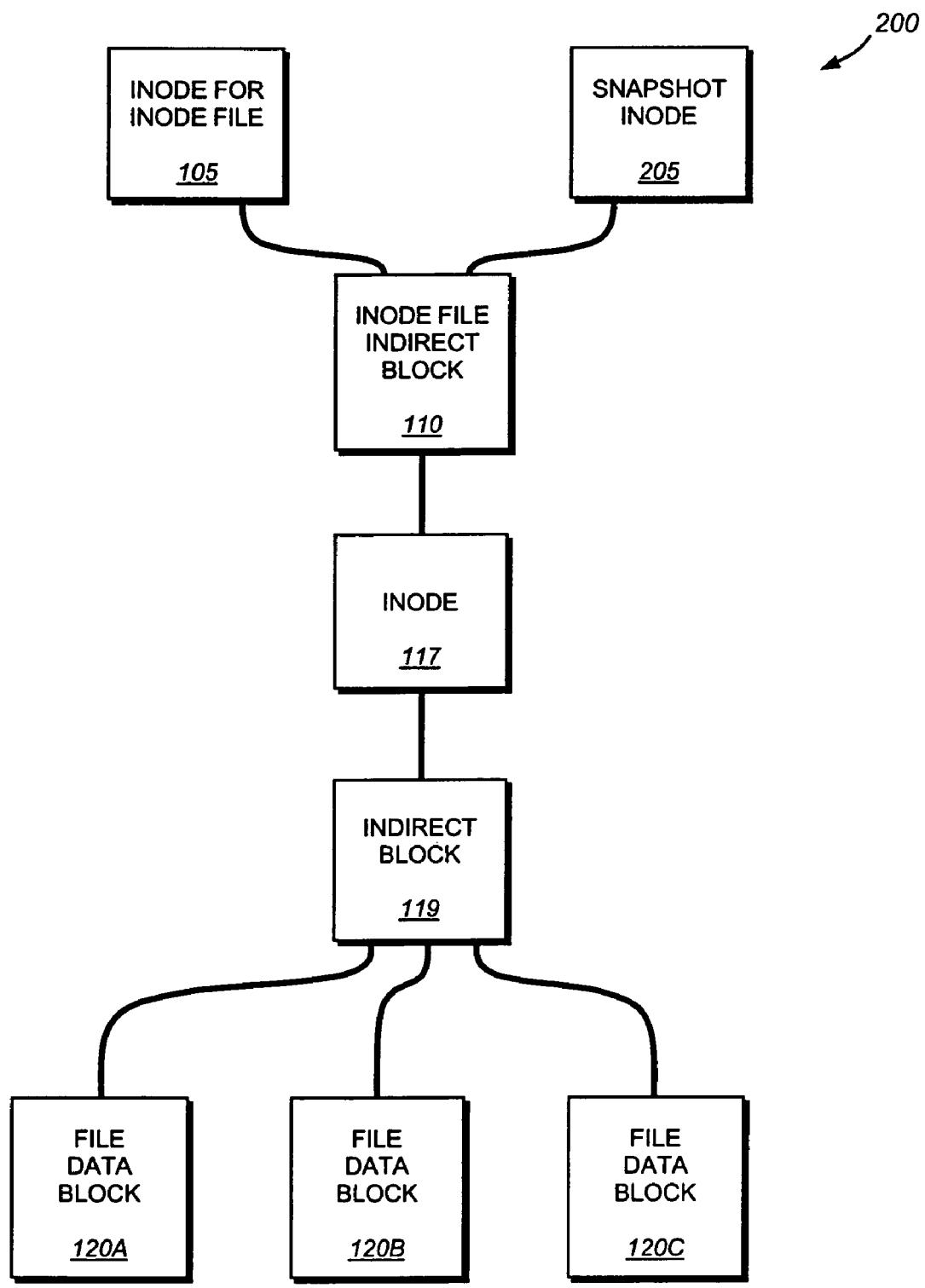
FIG. 2, already described, is a schematic block diagram of the exemplary file system inode structure of FIG. 1 including a snapshot inode.
Figure 3:
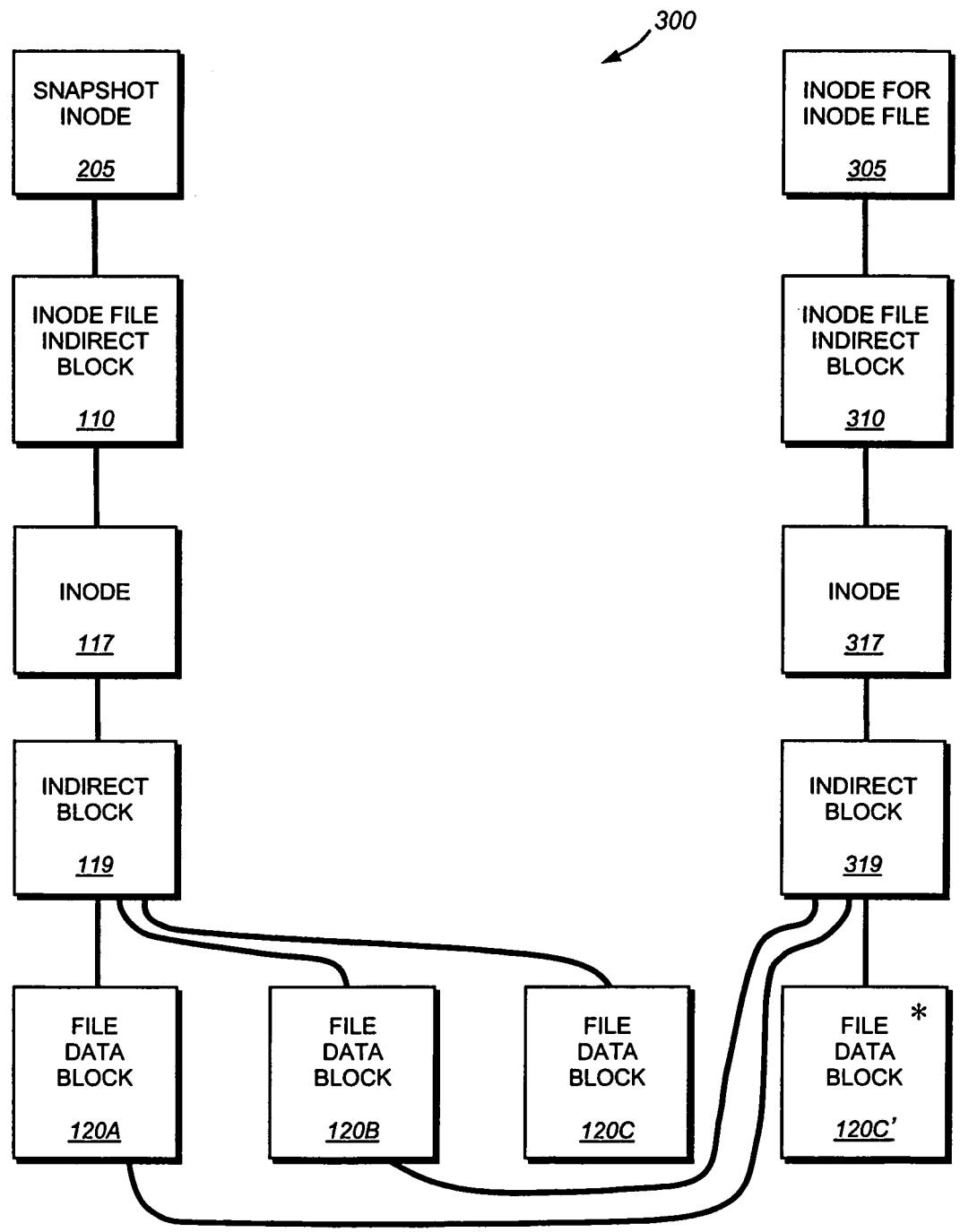
FIG. 3, already described, is a schematic block diagram of an exemplary file system inode structure of FIG. 2 after a data block has been rewritten.

The storage adapter 510 incorporates with the storage operating system 300 executing on the file server to access information requested by the client. Information maybe stored on the disks 406 of a disk 408 (FIG. 1) that is attached via the storage adapter 510 to the file server. The storage adapter 510 includes input/output (I/O) interface circuitry that couples to the disks over in I/O interconnect arrangement, such as a conventional high-performance Fibre Channel serial link topology. The information is retrieved by the storage adapter and, if necessary, processed by the processor 502 (or the adapter 510 itself) prior to be forwarded over the system bus 512 to the network adapter 506, where information is formatted into appropriate packets and returned to the client 404.

In one exemplary file server implementation, the file server can include a non-volatile random access memory (NVRAM) 508 that provides fault-tolerant backup of data, enabling the integrity of filer server transactions to survive a service interruption based upon a power failure, or other fault.

C. Storage Operating System

To facilitate the generalized access to the disks 406 on the array 408, the storage operating system 600 implements write-anywhere file system that logically organizes the information as a hierarchical structure of directories and files on the disks. Each "on-disk" file may be implemented as a set of disks blocks configured to distort information, such as data, where as the directory may be implemented as a specially formatted file which other files and directories are stored. As noted above, in the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be taken broadly to refer to any file system that is otherwise adaptable to the teachings of this invention.

The storage operating system comprises a series of software layers, including a media access layer 602 of network drivers (e.g., an Ethernet driver). The storage operating system 600 further includes network protocol layers, such as an Internet Protocol (IP) layer 604 and its supporting transport mechanisms, the Transport Control Protocol (TCP) layer 606 and the User Datagram Protocol (UDP) layer 608.

A file system protocol layer provides multi-protocol data access and, to that end, includes support for the Network File System (NFS) protocol 612, the Common Internet File System (CIFS) protocol 614 and the Hyper Text Transfer Protocol (HTTP) 616. In addition, the storage operating system 600 includes a disk storage layer 622 that implements a disk storage protocol, such as a RAID protocol, and a disk driver layer 624 that implements a disk access protocol such as, e.g., a Small Computer System Interface (SCSI) protocol.

Bridging the disk software layers with the network and file system protocol layers is a file system layer 626 of the storage operating system 600. Generally the file system layer 626 implements a file system having an on-disk format representation that is block-based using, e.g., 4-kilobyte (KB) data blocks and using inodes to describe the files. In response to transaction requests, the file system generates operations to load (retrieve) the requested data from volumes 434 if it is not resident "in-core", i.e., in the filer's memory 424. If the information is not in memory, the file system layer 626 indexes into the inode file using the inode number to access an appropriate entry and retrieve a logical volume block number. The file system layer 626 then passes the logical volume block number to the disk storage (RAID) layer, which maps that logical number to a disk block number and sends the latter to an appropriate driver (for example, an encapsulation of SCSI implemented on a fibre channel disk interconnection) of the disk driver layer. The disk driver accesses the disk block number from volumes 434 and loads the requested data in memory 424 for processing by the filer 420. Upon completion of the request, the filer (and storage operating system) returns a reply, e.g., a conventional acknowledgement packet defined by the CIFS specification, to the client 410 over the network 402.

It should be noted that the storage access request data path 630 through storage operating system layers described above needed to perform data storage access for the client requests received the file server may alternately be implemented in hardware, software or a combination of hardware and software. That is, in an alternative embodiment of this invention, the storage access request data path 630 may be implemented as logic circuitry embodied within a field programmable gate array (FPGA) or in an application specific integrated circuit (ASIC). This type of hardware implementation increases the performance of the file service provided by the file server 500 in response to a file system request issued by a client.

Included within the file system layer is a set of snapshot processes 628, which implement the inherent snapshot capabilities of the file system. The inherent snapshot capabilities of the WAFL file system are further described in the above-incorporated TR3002 File System Design for an NFS File Server Appliance and U.S. Pat. No. 5,819,292.

D. File Restoration from a Snapshot

Figure 7:
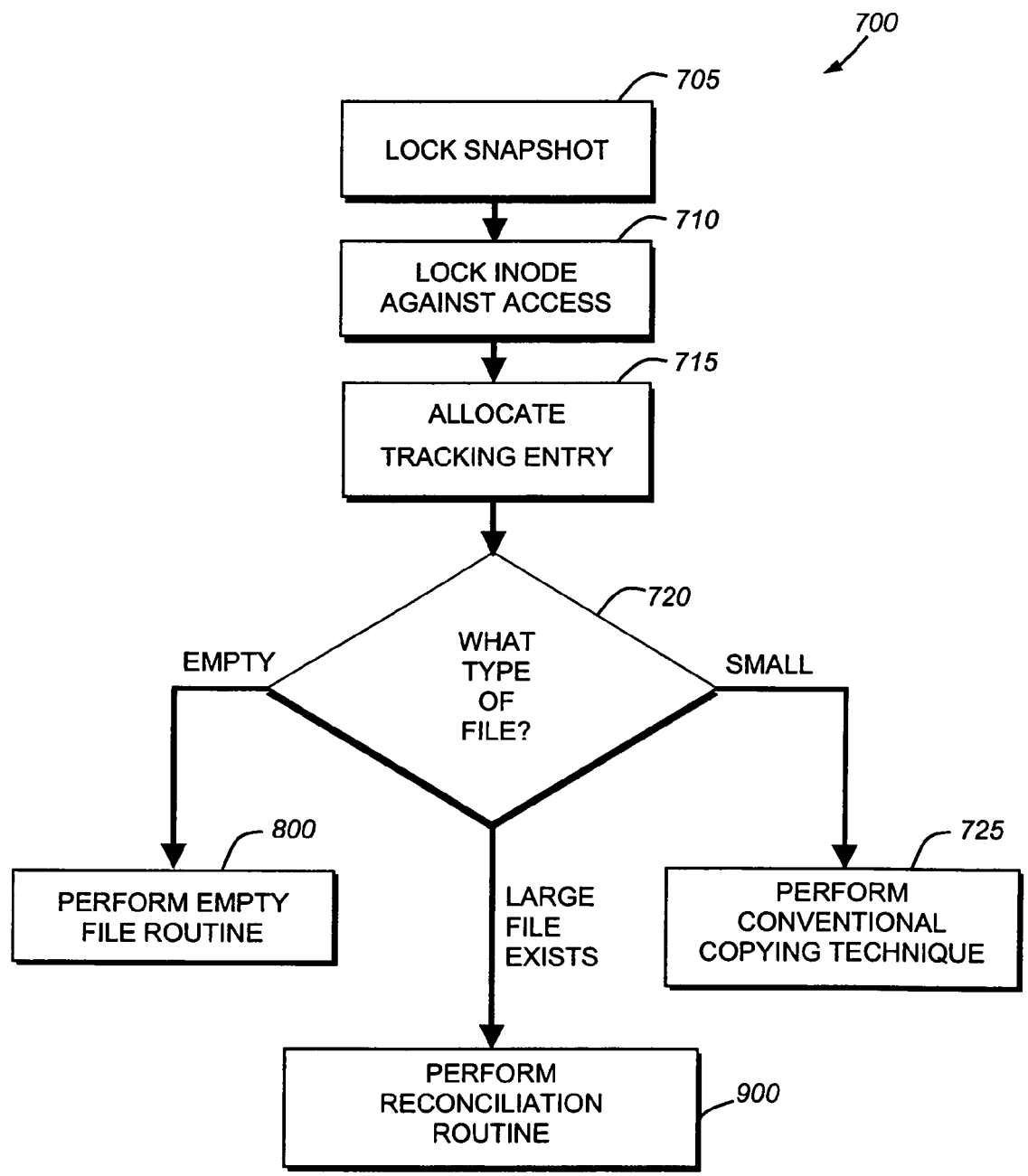
FIG. 7 is a flow chart of the procedure performed by the file restore process in accordance with an embodiment of this invention.

The procedure 700 performed by the file system layer of the storage operating system, or its associated snapshot processes, in restoring a file from a snapshot is shown in FIG. 7. Typically, such a process would be initiated by the use of a command entered by the user or administrator of the file server. This command could be entered either through a command line interface (CLI) or via a menu or other selection in a graphical user interface (GUI). As options to the command, the user enters the name and path to the file to be restored and, in alternate embodiments, a name and path for the file to be restored to, if it is different from the files original and/or location. Thus, for example, a file that was snapshotted when it existed in /dir/sub/file, could be restored to /foo/bar/other-file.

In step 705, the file restore process 632 first locks the associated snapshot. Such snapshot locking can be accomplished using known file system file locking mechanisms. The locking of the snapshot ensures that the snapshot will not be modified or deleted while the file is being restored. Next, in step 710, the inode associated with the file to be restored is locked against access. Such locking can be accomplished by, for example, setting a flag within the inode that is manipulated by an appropriate operating system lock manager. The file system layer and its associated processes recognize the flag and thereby restrict access to the inode. In certain embodiments, select file system processes or functions may have access to the inode. For example, a process or function for determining attributes of the file associated with the inode may be permitted to access the inode to determine file system parameters. Similarly, in certain embodiments, a command or process to delete the file may be permitted to execute even though the inode is locked against access.

The file restore process then creates a tracking entry (step 715). This tracking entry is utilized to determine which inodes and block pointers have been compared during the remaining portion of the restore process. Next, in step 720, the restore process determines what type of file is being restored. By "type of file" it is meant, in the illustrative embodiment, whether the file exists in the active file system, is absent from the active file system, or is a small file.

If the file to be restored is a small file, the process performs the conventional copying restore technique by duplicating the inodes' block pointers and data blocks from the snapshot to the active file system. If the file is absent from the active file system (i.e. the file has been deleted from the active file system), the restore process performs the empty file routine (routine 800). Otherwise, the file exists in the active file system and is not a small file. In such a case, the restore process proceeds to step 900 and performs the standard file restore routine.

Figure 8:
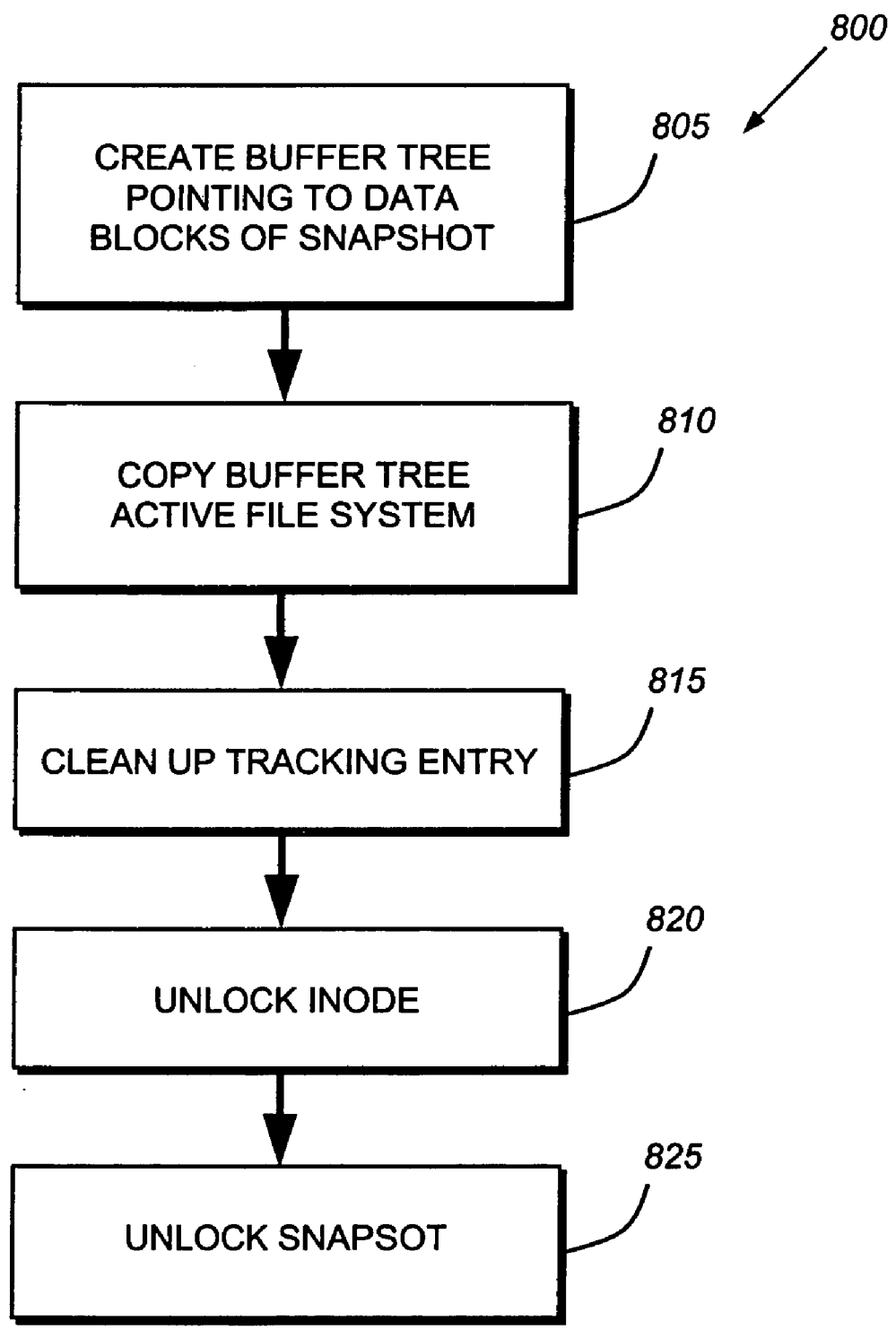
FIG. 8 is a flow chart detailing the procedure performed by the file restore process when restoring a file that has been deleted from the active file system in accordance with an embodiment of this invention.

The restore routine 800 performed by the restore process 632 when the file is not in the active file system is shown in FIG. 8. First, in step 805, the restore process creates a buffer tree pointing to the data blocks of the snapshot. This buffer tree is then copied to the active file system (step 810). By utilizing the data blocks stored in the snapshot, the number of additional inode blocks in the buffer tree is minimized as these data blocks do not need to be duplicated. Thus, minimal additional file system space is required. The tracking entry is then removed in step 815. This removal process entails, for example, the allocation of memory or other data structures associated with the tracking entry. The newly created inode is then unlocked in step 820. Finally, in step 825, the snapshot is unlocked. At this point, the newly created inode resides in the active file system and contains the proper pointers and buffer tree corresponding to the data blocks of the snapshot. By pointing to the data blocks stored in the snapshot, the number of inode blocks that must be written is decreased by a factor equal to the number of data blocks that each inode can point to. In the illustrative embodiment, each inode can point to 1,024 data blocks. Thus, by utilizing this restoration process, fewer than 1/1024 of the data block must be accessed compared to conventional snapshot restore methodologies.

Figure 9:
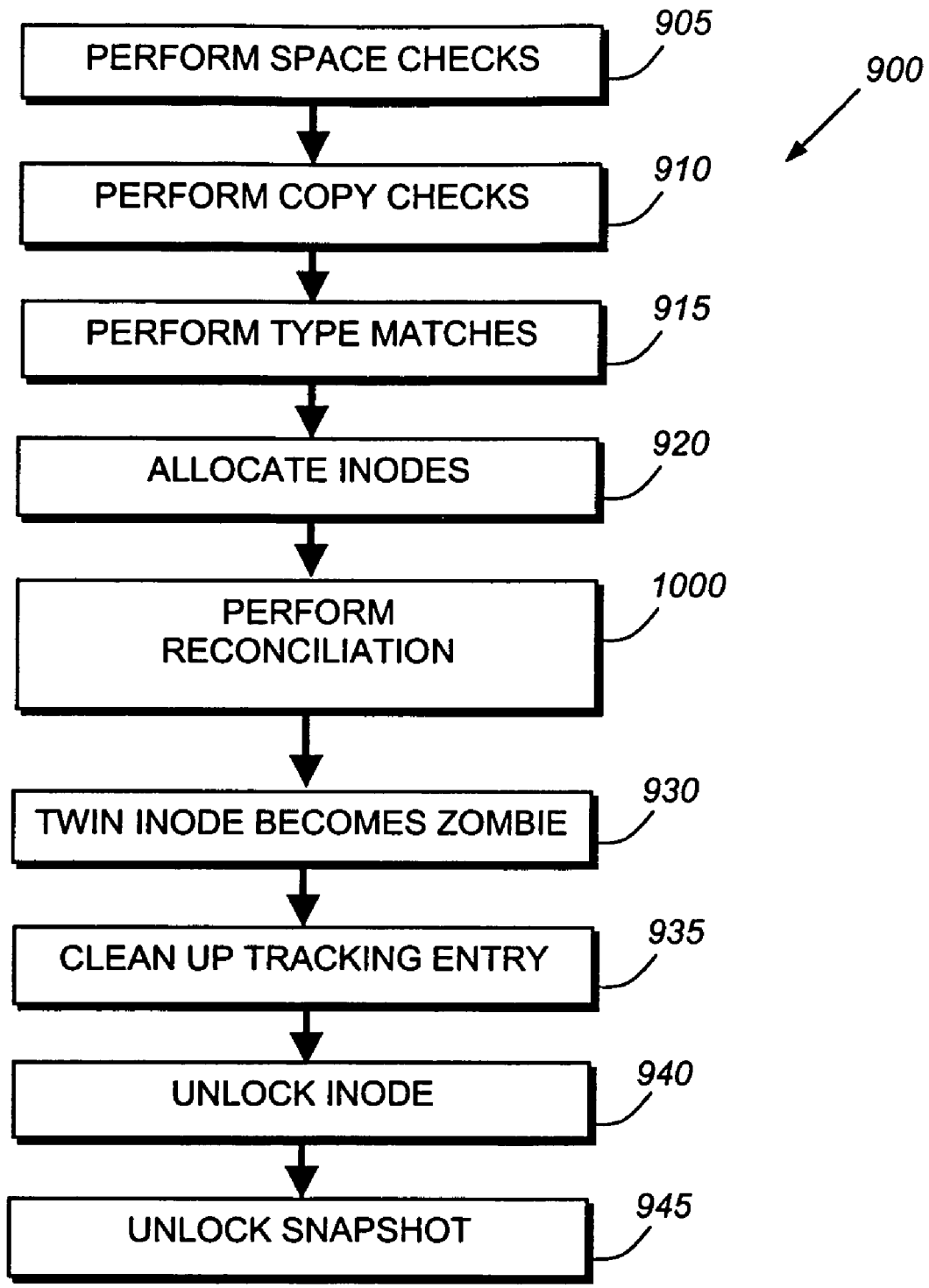
FIG. 9 is a flow chart detailing the procedure performed by the file restore process when the file exists in the active file system in accordance with an embodiment of this invention.

The process performed by the restore process 632 for a file that needs to undergo the above-referenced reconciliation process 900 is shown in FIG. 9. First, in step 905, the process performs a series of space checks. The space checks are to ensure that the newly created and restored file will fit within the active file system. While the process of the present invention typically requires little additional space in the active file system for files, there are several cases where substantial additional space is required. For example, if a file was 100 megabytes (MB) in size when the snapshot occurred, but since then has been edited so that it is only 1 MB in size, a restoration of the file results in some increased space within the active file system. This increase in space is still significantly smaller than used by conventional restore techniques. Next, the process performs a series of copy checks (step 910). In step 915, the restore process performs a type match. This type match ensures that, for example, no attempt is made to restore the file in the snapshot to a directory, or vice versa.

Next, in step 920, an inode and associated buffer trees are allocated for use during the restoration process. The inode that is allocated is a new inode for the restored file in the active file system. Additionally, the buffer trees of the existing file are copied to a twin. This twin, thus, has a twin inode and associated buffer trees. The restore process 632 then proceeds to do the reconciliation process in step 1000. This reconciliation process walks through the buffer trees of the twin and the snapshot and generates the restored file. In step 930, the twin inode is turned into a "zombie" inode. Zombie inodes are later processed by the file system layer. Such zombie processing is described in U.S. patent application Ser. No. 9/642,066 entitled MANIPULATION OF ZOMBIE FILES AND EVIL-TWIN FILES by Raymond C. Chen et al., now issued as U.S. Pat. No. 6,751,635 on Jun. 15, 2004, which is incorporated herein by reference. It should be noted that the use of zombie files is for illustrative purposes only. In alternate embodiments, the twin inode could simply be deleted or otherwise unallocated from the active file system. The tracking entry is then deleted by, for example, freeing memory or data structures associated with the tracking entry (step 935). The newly created inode of the file system is then unlocked (step 940). At this point the newly restored file is accessible by the active file system. Finally, in step 945, the snapshot is unlocked.

Figure 10:
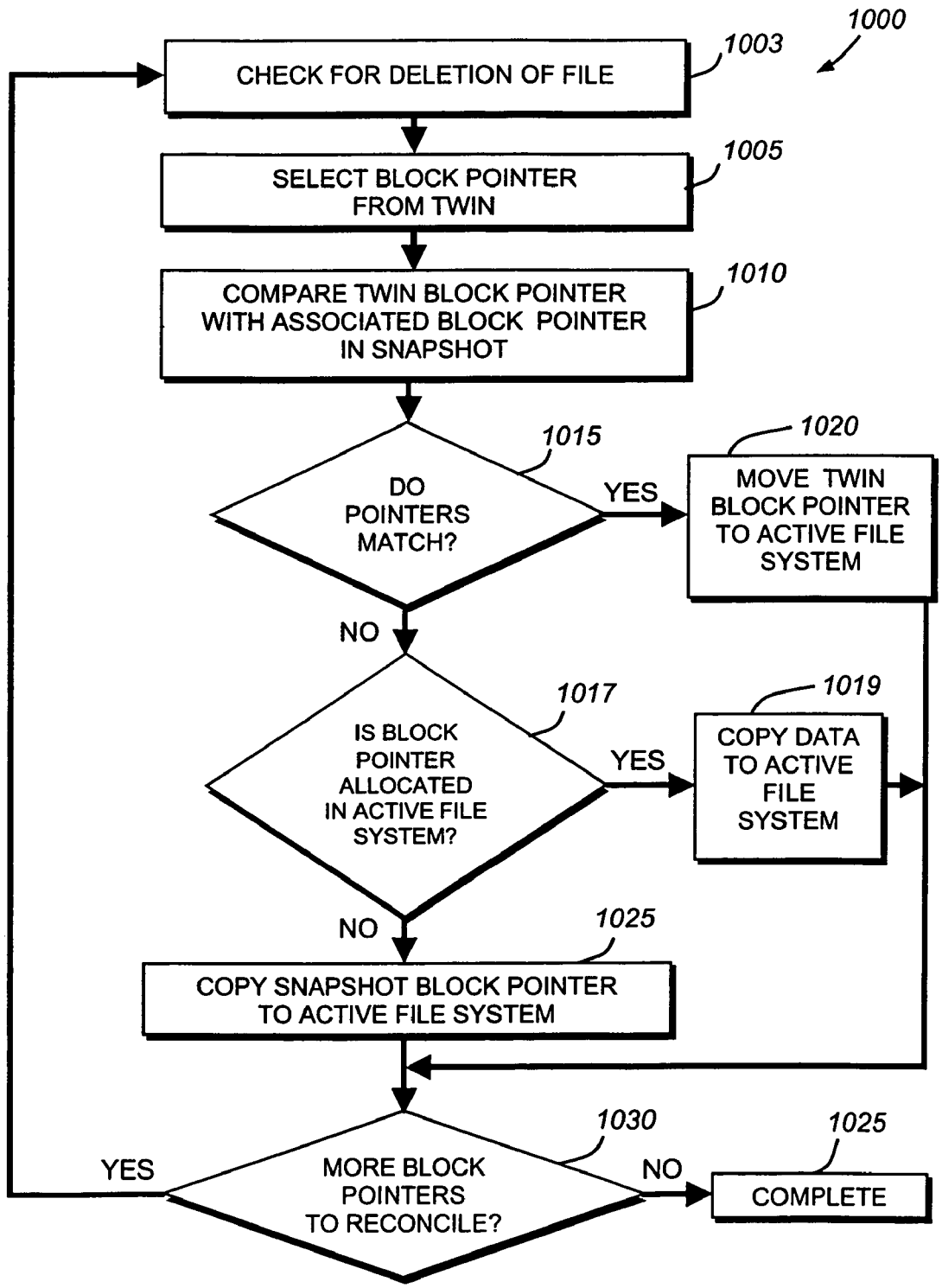
FIG. 10 is a flow chart of the reconciliation process performed by the file restore process in accordance with an embodiment of this invention.

The reconciliation process 1000 utilized by the restore process is shown in FIG. 10. The reconciliation process first checks for file deletion (step 1003). This check is to ensure that if a user deletes the file being restored, the file will be deleted and the restoration process will not proceed. The restore process then selects a block pointer from the twin (step 1005). The twin block pointer is then compared with the associated block pointer stored in the snapshot in step 1010. A determination is made, in step 1015 if the block pointers match. By match it is meant that the two block pointers point to the same data blocks. If the two block pointers do match, the block pointer from the twin is moved to the active file system in step 1020. If the block pointers do not match, a determination is made if the block that is pointed to by the block pointer is already allocated in the active file system (step 1017). If the block is already allocated, then the data from the block is copied to a new block in the active file system. Otherwise, the block pointer from the snapshot is copied to the active file system. Thus, if a particular block pointer has not been modified from the time of the snapshot to the time of file restoration, the block pointer from the associated twin, which is a copy of the block pointer stored in the active file system, is moved to the active file system. If the associated block pointer has been modified, a copy of the block pointer is generated from that stored in the snapshot and copied to the active file system if the block is not allocated in the active file system. Next, in step 1030, the restore process determines if there are more block pointers that need to be reconciled. If there are no more block pointers to reconcile, the reconciliation process 1000 is complete (step 1035) and the restore process 632 continues on in accordance with the procedure outlined in FIG. 9. If there are more block pointers to be reconciled, the process loops back to step 1003 and performs an additional deletion check. Throughout the reconciliation process 1000, the tracking entry is used to determine which blocks have been compared and which blocks need to be compared. In accordance with an alternate embodiment, multiple blocks can be compared at a time. For example, sixteen blocks can be read from the twin and compared with their associated snapshot blocks at a time. The use of multi-block comparison improves the performance of the reconciliation process.

Figure 11:
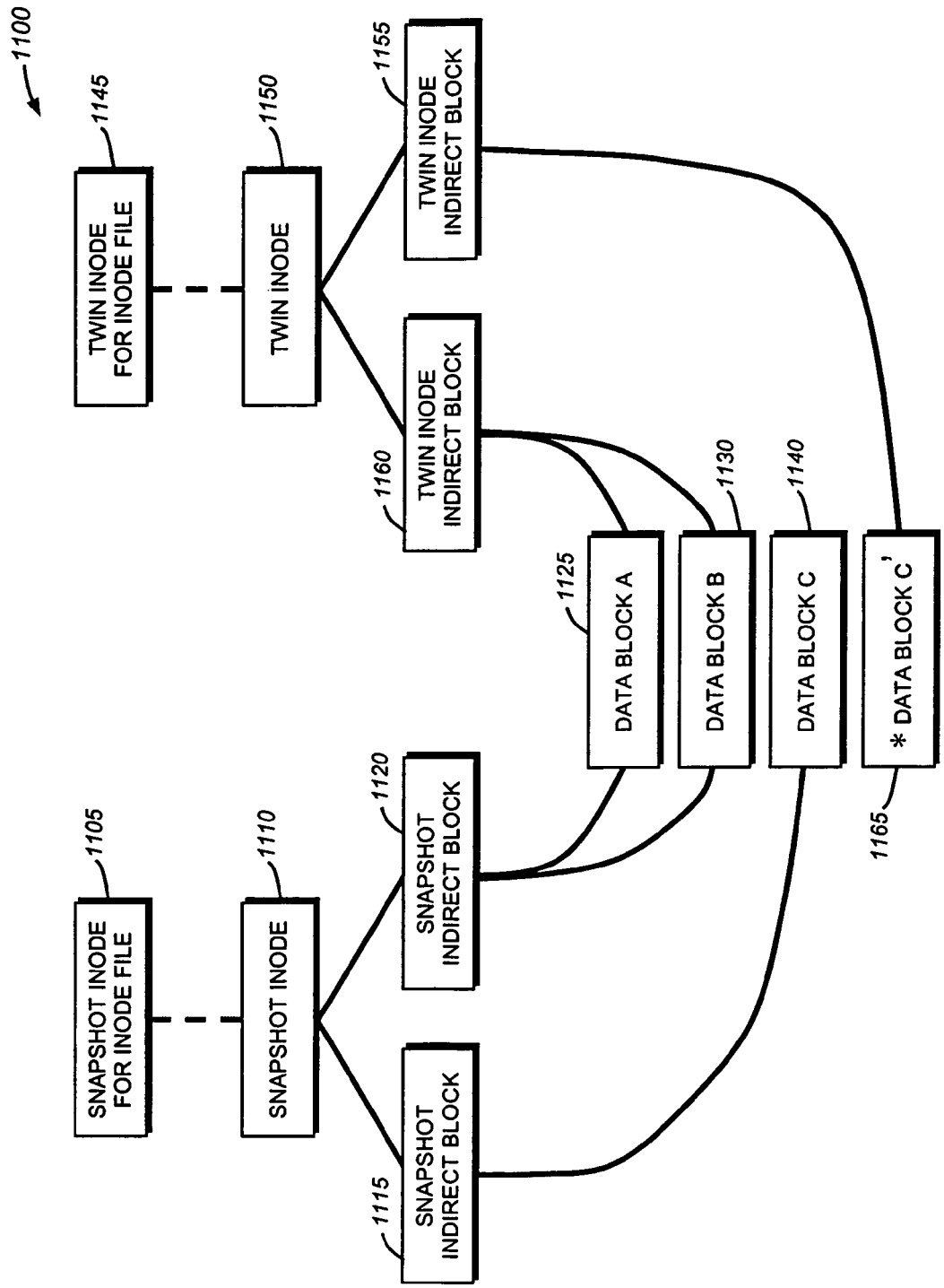
FIG. 11 is an exemplary file system data structure having a snapshot in a twin inode.

An exemplary snapshot and twin pair is shown in FIG. 11. The snapshot includes snapshot inode 1105 linked to a snapshot inode 1110. The various intermediate layers of inodes between the snapshot inode for the inode file 1105 and a snapshot inode 1110 have been omitted for simplicity. The snapshot inode 1110 is further linked to two snapshot indirect blocks 1115 and 1120. Snapshot indirect inode 1115 is linked to data block C 1140. Similarly, snapshot indirect inode 1120 is linked to data blocks A and B 1125 and 1130. The twin inode 1145 is linked to a twin inode 1150. Again, the various layers between the twin inode for the inode file 1145 and the twin inode 1150 have been omitted for simplicity. The twin inode is further linked to twin inode indirect inodes 1155 and 1160. Twin inode indirect 1155 is linked to data block C' 1165. Data block C' 1165 is a modified data block C 1140. This modification can be caused by, for example, addition or deletion of data from the data block. Similarly, twin inode indirect inode 1160 is linked to data blocks A and B 1125 and 1130. This snapshot and twin environment 1100 thus represents a snapshot and twin of a file containing twin data blocks A, B and C, wherein the data block C has been modified between the time that the snapshot was generated and the time the twin was created during the file restore process.

Figure 12:
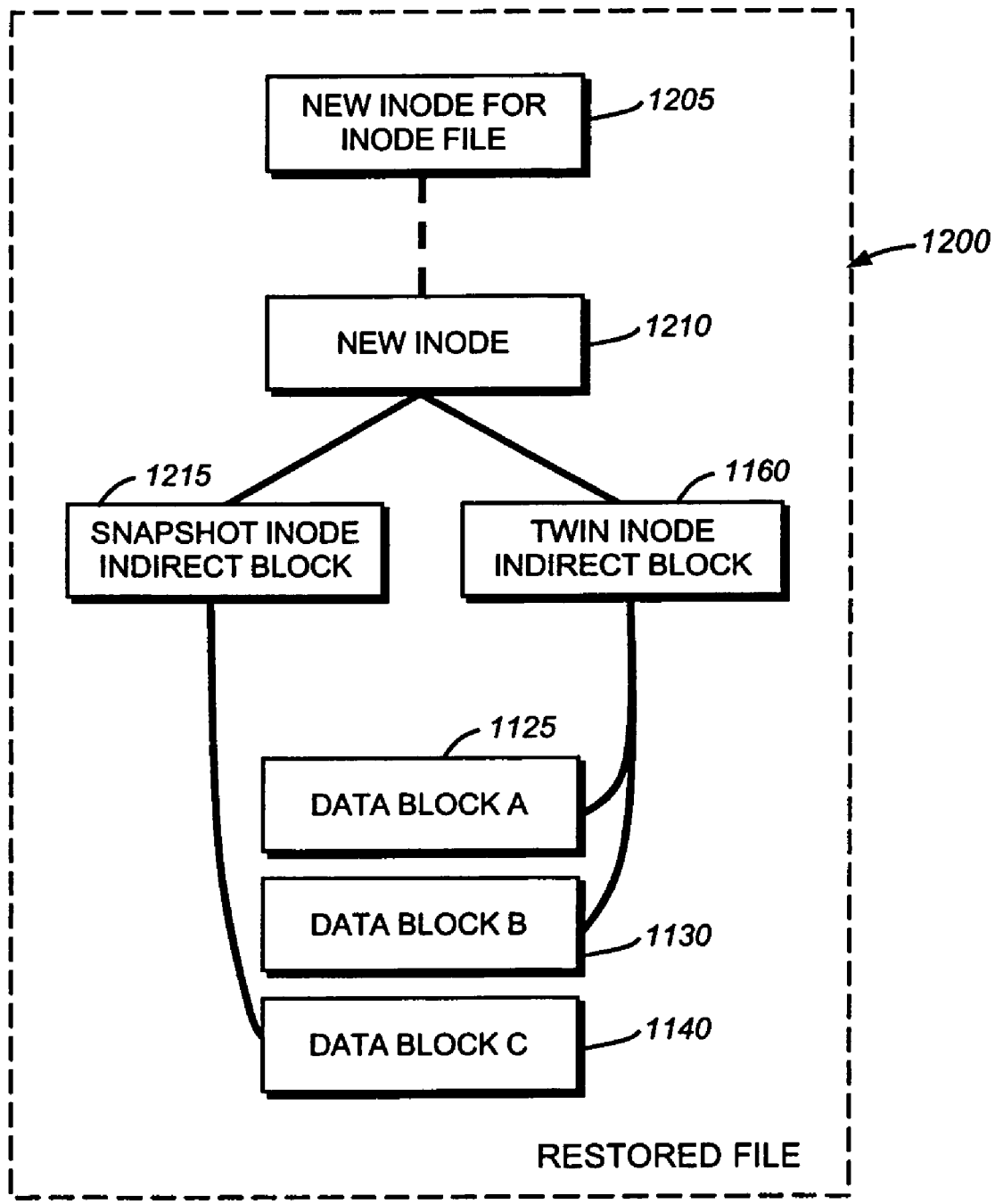
FIG. 12 is a schematic block diagram of an exemplary restored file inode structure in accordance with an embodiment of this invention.

An exemplary block diagram of the inodes and data blocks of a restored file 1200 of the example from FIG. 11 is shown in FIG. 12. The newly created inode 1205 links via various layers of inodes (not shown) to a new inode 1210. The inode 1210 points to a copy of the snapshot inode indirect inode 1215 and the twin inode indirect inode 1160. The copy of the snapshot inode indirect inode 1215 contains a further point to data block C 1140. Similarly, the twin inode indirect inode 1160 points to data blocks A and B 1125 and 1130.

Figure 13:
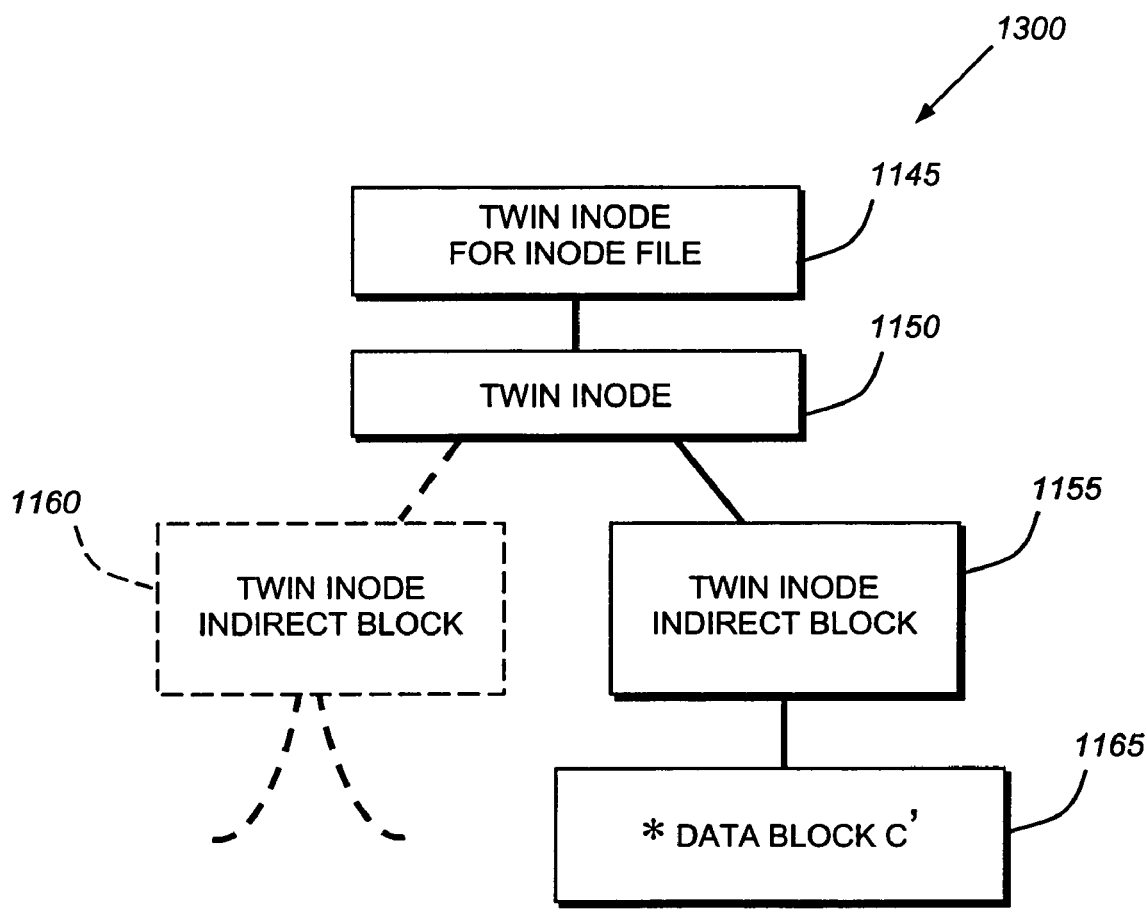
FIG. 13 is a schematic block diagram of an exemplary twin inode data structure after the reconciliation has completed in accordance with an embodiment of this invention.

After the reconciliation process 1000 is complete, the twin inode contains links to only inodes and buffer trees which are changed from the snapshot. In the example of FIGS. 11 and 12, the remnants of the twin inode is shown in FIG. 13. The twin inode for the inode file 1145 links to the twin inode 1150. This twin inode 1150 links to a twin inode indirect inode 1155 which, in turn, links to data block C' 1165. It is this twin inode 1145 and its associated changed inodes and data blocks which is turned into a zombie in accordance with the illustrative embodiment of the invention.

To again summarize, upon the execution of the file restored process, which may be included in the file system layer or snapshot processes of a storage operating system, the snapshot and inodes are locked against access and a tracking entry is created. The file restore process then determines what type of file is being restored. If the file meets a predetermined or user-defined definition of a "small" file, then a conventional snapshot duplication technique can be utilized to restore the file. If the file has been deleted from the active file, then the restore process generates a buffer tree which points to the data block stored in the snapshot. Once this buffer tree is created, it is written to the active file system to restore the file. If the file exists in the active file system, then a reconciliation process occurs. After performing a series of verification operations, the restore process allocates a new inode for the restored file and creates a twin inode which contains the inodes associated with the file currently in the active file system. A reconciliation process is then performed whereby a block from the twin is compared to a block in the snapshot. If the blocks are equal, the block from the twin is moved to the active file system. If the blocks are not equal, the block from the snapshot is copied to the active file system. This reconciliation procedure proceeds until all blocks in the twin and snapshot have been compared. At the end of the reconciliation procedure, the twin only contains links and pointers to blocks which have been modified since the time of the snapshot. This twin inode is then turned into a zombie for later processing and deletion. This process thus significantly reduces the number of data blocks that need to be copied from the snapshot to the active file system. By reducing the number of data copies, file system space is saved and processing overhead is reduced.

In the illustrative embodiment, the reconciliation operations are logged to the NVRAM 508 (see FIG. 5) of the computer. This NVRAM logging enables the various reconciliation operations to be replayed in the event of an unexpected interruption of the reconciliation process. In the event of an unexpected shutdown caused by, for example, a crash of the computer, all operations will have been logged from the beginning of the restore procedure to the time of the shutdown. When the computer re-initializes, the various operations can be replayed to the file system.

Additionally, by storing state information in the tracking entry, the reconciliation process can be restarted at any time. As the current status of the procedure is stored in the tracking entry, upon a re-initialization, the procedure can resume operation from the point at which it was interrupted. This enables the reconciliation process to continue operation even after an interruption, e.g., a reboot or power failure.

The forgoing has been a detailed description of the illustrative embodiment of the invention. Various modifications and additions can be made without departing from the spirit and scope of the invention. For example, it is understood that the various data structures and inodes can include additional fields and/or be generated or managed by differing layers of a storage operating system while remaining within the scope of the present invention. Additionally, while this description has been written and referenced to file servers and filers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for restoring data from a snapshot to an active file system of a storage system, comprising:
   duplicating at the storage system an inode of the data from the active file system, wherein the data exists in both the snapshot and the active file system;
   creating at the storage system a twin inode for the data in the active file system, wherein the twin inode comprises the duplicated inode;
   generating at the storage system a new inode for the data; and
   comparing a twin block pointer associated with the twin inode to a snapshot block pointer associated with a snapshot inode of the snapshot for the data,
      if the twin block pointer matches the snapshot block pointer, moving the twin block pointer from the twin inode to the new inode in the active file system, and
      if the twin block pointer does not match the snapshot block pointer, and a data block pointed to by the snapshot block pointer is not allocated in the active file system, copying the snapshot block pointer from the snapshot inode to the new inode in the active file system.

2. The method of claim 1 further comprising:
   if the twin block pointer does not match the snapshot block pointer and the data block pointed to by the snapshot block pointer is allocated in the active file system, copying the data block from the snapshot to the active file system.

3. The method of claim 1 further comprising:
   copying a block pointer associated with the file in the active file system to the twin inode to create the twin block pointer.

4. The method of claim 1 further comprising:
   deallocating the twin inode from the active file system.

5. The method of claim 4 further comprising:
   designating the twin inode as a zombie inode.

6. The method of claim 1 further comprising:
   creating at the storage system a tracking entry, the tracking entry storing state information related to progress in restoring the data, and the tracking entry enabling the restoring to be resumed after an interruption.

7. The method of claim 1 further comprising:
   locking the snapshot with a file locking mechanism of the storage system to prevent modification of the snapshot while the data is being restored or to prevent deletion of the snapshot while the data is being restored.

8. The method of claim 1 further comprising:
   performing by the storage system one or more space checks to verify there is sufficient storage space in the active file system to permit restoring of the data.

9. A method for restoring data from a snapshot to an active file system of a computer, comprising:
   duplicating an inode of the data from the active file system;
   creating a second inode for the data in the active file system, wherein the second inode comprises the duplicated inode;
   comparing one or more block pointers associated with the second inode to one or more block pointers associated with the snapshot;
   if the block pointer associated with the second inode matches the block pointer associated with the snapshot, moving the block pointer associated with the second inode to the active file system; and if the block pointer associated with the second inode does not match the block pointer associated with the snapshot, copying data associated with the snapshot to the active file system.

10. The method of claim 9, wherein copying the data associated with the snapshot further comprises:
if a data block pointed to by the block pointer associated with the snapshot is not allocated in the active file system, copying the block pointer associated with the snapshot to the active file system; and
if the data block pointed to by the block pointer associated with the snapshot is allocated in the active file system, copying the data block from the snapshot to the active file system.

11. A computer-readable storage medium containing executable program instructions executed by a processor, comprising:
program instructions that duplicate an inode of data from an active file system of a computer;
program instructions that create at the computer a twin inode for the data in the active file system, wherein the twin inode comprises the duplicated inode;
program instructions that generate at the computer a new inode for the data; and
program instructions that compare a twin block pointer associated with the twin inode to a snapshot block pointer associated with a snapshot inode of the snapshot for the data, and,
program instructions that, if the twin block pointer matches the snapshot block pointer, move the twin block pointer from the twin inode to the new inode in the active file system, and
program instructions that, if the twin block pointer does not match the snapshot block pointer, and a data block pointed to by the snapshot block pointer is not allocated in the active file system, copy the snapshot block pointer from the snapshot inode to the new inode in the active file system.

12. A computer-readable storage medium containing executable program instructions executed by a processor, comprising:
program instructions that duplicate an inode of data from the active file system of a computer;
program instructions that create at the computer a second inode for the data in the active file system, wherein the twin inode comprises the duplicated inode;
program instructions that compare one or more block pointers associated with the second inode to one or more block pointers associated with the snapshot; and
program instructions that, if the block pointer associated with the second inode matches the block pointer associated with the snapshot, move the block pointer associated with the second inode to the active file system, and
program instructions that, if the block pointer associated with the second inode does not match the block pointer associated with the snapshot, copy data associated with the snapshot to the active file system.

13. A storage system configured to restore data from a snapshot to an active file system of the storage system, comprising:
a processor of the storage system configured to execute a restoration process, the restoration process configured to restore the data by, duplicating an inode of the data from the active file system, creating a twin inode for the data in the active file system, wherein the twin inode comprises the duplicated inode, generating a new inode for the data, comparing a twin block pointer associated with the twin inode to a snapshot block pointer associated with a snapshot inode for the data in the snapshot, and if the twin block pointer matches the snapshot block pointer, the restoration process is further configured to move the twin block pointer from the twin inode to the new inode in the active file system, and if the twin block pointer does not match the snapshot block pointer, and a data block pointed to by the snapshot block pointer is not allocated in the active file system, the restoration process is further configured to copy the snapshot block pointer from the snapshot inode to the new inode in the active file system.

14. A method, comprising:
storing a file within an active file system on a computer server;
generating a snapshot of the entire active file system, wherein the file exists in both the snapshot and the active file system;
creating a twin inode for the file in the active file system, wherein the twin inode comprises at least a portion of the file from the active file system;
comparing a twin block pointer associated with the twin inode to a snapshot block pointer associated with a snapshot inode for the file in the snapshot, and
if the twin block pointer matches the snapshot block pointer, moving the twin block pointer from the twin inode to a new inode in the active file system, and
if the twin block pointer does not match the snapshot block pointer and a data block pointed to by the snapshot block pointer is not allocated in the active file system, copying the snapshot block pointer from the snapshot inode to a new inode in the active file system; and
restoring only the file from the snapshot to the active file system.

15. The method of claim 14, further comprising:
if the twin block pointer does not match the snapshot block pointer, and the data block pointed to by the snapshot block pointer is allocated in the active file system, copying the data block from the snapshot to the active file system.

* * * * *

UNITED STATES PATENT AND TRADEMARK OFFICE
CERTIFICATE OF CORRECTION

| | | |
|---|---|---|
| PATENT NO. | : 7,930,275 B2 | Page 1 of 1 |
| APPLICATION NO. | : 11/290217 | |
| DATED | : April 19, 2011 | |
| INVENTOR(S) | : Raymond C. Chen | |

It is certified that error appears in the above-identified patent and that said Letters Patent is hereby corrected as shown below:

In Col. 12, line 34:
 copying a block pointer associated with the ~~file~~ data in the active Signed and Sealed this
Eighth Day of May, 2012

David J. Kappos
*Director of the United States Patent and Trademark Office*